United States Patent [19]
Lim

[11] Patent Number: 5,636,051
[45] Date of Patent: Jun. 3, 1997

[54] THIN FILM ACTUATED MIRROR ARRAY HAVING DIELECTRIC LAYERS

[75] Inventor: Yong-Geun Lim, Seoul, Rep. of Korea

[73] Assignee: Daewoo Electronics Co., Ltd, Seoul, Rep. of Korea

[21] Appl. No.: 581,015

[22] Filed: Jan. 3, 1996

[51] Int. Cl.$^6$ .............. G02B 26/00; H01L 41/04
[52] U.S. Cl. ............ 359/290; 359/295; 359/221; 359/224; 359/846; 310/328
[58] Field of Search .................. 359/290, 291, 359/295, 221, 224, 846, 848, 230; 310/328, 333

[56] References Cited

U.S. PATENT DOCUMENTS

| | | | |
|---|---|---|---|
| 3,544,201 | 12/1970 | Fowler et al. | 359/224 |
| 3,758,199 | 9/1973 | Thaxter | 359/224 |
| 4,492,435 | 1/1985 | Banton et al. | 359/295 |
| 5,172,262 | 12/1992 | Hornbeck | 359/230 |
| 5,247,222 | 9/1993 | Engle | 310/328 |
| 5,481,396 | 1/1996 | Ji et al. | 359/295 |
| 5,512,793 | 4/1996 | Takeuchi et al. | 310/328 |

FOREIGN PATENT DOCUMENTS 0671645  9/1995  European Pat. Off. .

OTHER PUBLICATIONS

Quantum Electronics, vol. 23, No. 9, Sep. 1993, NewYork US, pp. 813–815, XP000417894 L.L. Balakireva et al.: "optimization of highly reflective multilayer mirrors for the wavelength interval 100–150 nm" *p. 813, column 1, paragraph 2*.

*Primary Examiner*—Loha Ben
*Attorney, Agent, or Firm*—Anderson Kill & Olick P.C.

[57] ABSTRACT

An array of M×N thin film actuated mirrors includes an active matrix, an array of actuating structures, each of the actuating structures including an elastic member, a second thin film electrode, a thin film electrodisplacive member and a first thin film electrode, and M×N number of multilayer stacks of thin film dielectric members. In addition to providing a protection against chemical or physical attacks on the first thin film electrode which also acts as a mirror for reflecting a light beam, the multilayer stack of thin film dielectric members placed on top of each of the actuating structures provides the maximum reflectance in each of the thin film actuated mirrors to thereby ensure an optimum optical efficiency of the array.

7 Claims, 8 Drawing Sheets

THIN FILM ACTUATED MIRROR ARRAY HAVING DIELECTRIC LAYERS

FIELD OF THE INVENTION

The present invention relates to an optical projection system; and, more particularly, to an array of M×N thin film actuated mirrors for use in the system and a method for the manufacture thereof, wherein each of the thin film actuated mirrors is provided with a multilayer stack of dielectric members successively formed on top of each of the thin film actuated mirrors to produce an optimum optical efficiency thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, thin film actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in preparing an array 10 of M×N thin film actuated mirrors 11, wherein M and N are integers, disclosed in a copending commonly owned application, U.S. Ser. No. 08/430,628, entitled "THIN FILM ACTUATED MIRROR ARRAY".

The process for manufacturing the array 10 begins with the preparation of an active matrix 20 comprising a substrate 22, an array of M×N transistors(not shown) and an array of M×N connecting terminals 24.

In a subsequent step, there is formed on top of the active matrix 20 a thin film sacrificial layer 40 by using a sputtering or an evaporation method if the thin film sacrificial layer 40 is made of a metal, a chemical vapor deposition(CVD) or a spin coating method if the thin film sacrificial layer 40 is made of a phosphor-silicate glass(PSG), or a CVD method if the thin film sacrificial layer 40 is made of a poly-Si.

Thereafter, there is formed a supporting layer 15 including an array of M×N supporting members 30 surrounded by the thin film sacrificial layer 40, wherein the supporting layer 15 is formed by: creating an array of M×N empty slots(not shown) in the thin film sacrificial layer 40 by using a photolithography method, each of the empty slots being located around the connecting terminals 24; and forming a supporting member 30 in each of the empty slots by using a sputtering or a CVD method, as shown in FIG. 1A. The supporting members 30 are made of an insulating material.

In a following step, an elastic layer 70 made of the same insulating material as the supporting members 30 is formed on top of the supporting layer 15 by using a Sol-Gel, a sputtering or a CVD method.

Subsequently, a conduit 35 made of a metal is formed in each of the supporting members 30 by: first creating an array of M×N holes(not shown), each of the holes extending from top of the elastic layer 70 to top of the connecting terminals 24, by using an etching method; and filling therein with the metal to thereby form the conduit 35, as shown in FIG. 1B.

In a next step, a second thin film layer 60 made of an electrically conducting material is formed on top of the elastic layer 70 including the conduits 35 by using a sputtering method. The second thin film layer 60 is electrically connected to the transistors through the conduits 35 formed in the supporting members 30.

Then, a thin film electrodisplacive layer 80 made of a piezoelectric material, e.g., lead zirconium titanate(PZT), is formed on top of the second thin film layer 60 by using a Sol-Gel, a sputtering or a CVD method, as shown in FIG. 1C.

In an ensuing step, the thin film electrodisplacive layer 80, the second thin film layer 60 and the elastic layer 70 are patterned into an array of M×N thin film electrodisplacive members 85, an array of M×N second thin film electrodes 65 and an array of M×N elastic members 75 by using a photolithography or a laser trimming method until the supporting layer 15 is exposed, as shown in FIG. 1D. Each of the second thin film electrodes 65 is connected electrically to a corresponding transistor through the conduit 35 formed in each of the supporting members 30 and functions as a signal electrode in each of the thin film actuated mirrors 11.

Next, each of the thin film electrodisplacive members 85 is heat treated to allow a phase transition to take place to thereby form an array of M×N heat treated structures(not shown). Since each of the thin film electrodisplacive members 85 is sufficiently thin, there is no need to pole it in case it is made of a piezoelectric material: for it can be poled with the electric signal applied during the operation of the thin film actuated mirrors 11.

After the above step, an array of M×N first thin film electrodes 55 made of an electrically conducting and light reflecting material, e.g., aluminum(Al) or silver(Ag), is formed on top of the thin film electrodisplacive members 85 in the array of M×N heat treated structures by first forming a layer 50, made of the electrically conducting and light reflecting material, completely covering top of the array of M×N heat treated structures, including the exposed supporting layer 15, using a sputtering method, as shown in FIG. 1E, and then selectively removing the layer 50, using an etching method, resulting in an array 90 of M×N actuated mirror structures 95, wherein each of the actuated mirror structures 95 includes a top surface and four side surfaces, as shown in FIG. 1F. Each of the first thin film electrodes 55 functions as a mirror as well as a bias electrode in each of the thin film actuated mirrors 11.

The preceeding step is then followed by completely covering the top surface and the four side surfaces in each of the actuated mirror structures 95 with a thin film protection layer(not shown).

The thin film sacrificial layer 40 in the supporting layer 15 is then removed by using an etching method. Finally, the thin film protection layer is removed by using an etching method to thereby form the array 10 of M×N thin film actuated mirrors 11, as shown in FIG. 1G.

There are certain deficiencies associated with the above described array 10 of thin film actuated mirrors 11 and the method for the manufacture thereof. During the removal of the thin film protection layer, an etchant used therein may chemically attack the first thin film electrode 55, which also functions as a mirror, in each of the thin film actuated mirrors 11, which may adversely affect the optical efficiency of the array 10 of thin film actuated mirrors 11. In addition, the first thin film electrode 55 may become oxidized, especially when the first thin film electrode 55 is made of Ag, further reducing the reflectivity thereof.

SUMMARY OF THE INVENTION

It is, therefore, a primary object of the present invention to provide an array of M×N thin film actuated mirrors capable of ensuring an optimum optical efficiency and a method for the manufacture thereof.

In accordance with one aspect of the present invention, there is provided an array of M×N thin film actuated mirrors, wherein M and N are integers, for use in an optical projection system, the array comprising: an active matrix including a substrate, an array of M×N connecting terminals and an array of M×N transistors, wherein each of the connecting terminals is electrically connected to a corresponding transistor in the array of M×N transistors; M×N conduits, wherein each of the conduits is made of an electrically conducting material; an array of M×N actuating structures, each of the actuating structures being provided with a connecting and a light reflecting portions, each of the actuating structures including an elastic member, a second thin film electrode, a thin film electrodisplacive member and a first thin film electrode, wherein each of the conduits is located at the connecting portion in each of the actuating structures, extending from bottom of the second thin film electrode to top of the connecting terminal connected electrically to a corresponding transistor, to thereby allow the second thin film electrode to function as a signal electrode in each of the thin film actuated mirrors, and the first thin film electrode made of a light reflecting and electrically conducting material is grounded to thereby function as a mirror and a bias electrode in each of the thin film actuated mirrors; and M×N number of multilayer stacks of thin film dielectric members, each of the thin film dielectric members placed on top of the light reflecting portion in each of the actuating structures, wherein said each of the thin film dielectric members has a predetermined thickness and a specific refractive index.

In accordance with another aspect of the present invention, there is provided a method for the manufacture of an array of M×N thin film actuated mirrors, the method comprising the steps of: providing an active matrix including a substrate, an array of M×N connecting terminals and an array of M×N transistors, wherein each of the connecting terminals is electrically connected to a corresponding transistor; depositing a thin film sacrificial layer on top of the active matrix; creating an array of M×N empty slots in the thin film sacrificial layer, each of the empty slots being located around top of the connecting terminals; depositing an elastic layer made of an insulating material on top of the thin film sacrificial layer while filling the empty slots; forming an array of M×N conduits in the elastic layer, each of the conduits extending from top of the elastic layer to top of a corresponding connecting terminal; depositing a second thin film layer, a thin film electrodisplacive layer and a first thin film layer successively on top of the elastic layer, wherein the second thin film layer is made of an electrically conducting material, and the first thin film layer is made of an electrically conducting and light reflecting material; patterning the first thin film, the thin film electrodisplacive, the second thin film and the elastic layers, respectively, until the thin film sacrificial layer is exposed, thereby forming an array of M×N semifinished actuating structures, wherein each of the semifinished actuating structures is provided with a first thin film electrode, a thin film electrodisplacive member, a second thin film electrode and an elastic member; depositing a plurality of thin film dielectric layers successively on top of the semifinished actuating structures including the exposed thin film sacrificial layer, each of the thin film dielectric layers having a predetermined thickness; patterning the plurality of thin film dielectric layers, respectively, into M×N number of multilayer stacks of thin film dielectric members, until the thin film sacrificial layer is exposed again, thereby forming an array of M×N semifinished actuated mirrors, wherein the plurality of thin film dielectric layers are patterned in such a way that each of the semifinished actuated mirrors is divided arbitrarily into an actuating and a light reflecting portions, each of the conduits and each of the thin film dielectric members being located at the actuating portion and the light reflecting portion in each of the semifinished actuated mirrors, respectively; covering each of the semifinished actuated mirrors with a thin film protection layer to thereby form an array of M×N protected actuated mirrors; removing the thin film sacrificial layer; and removing the thin film protection layer to thereby form the array of M×N thin film actuated mirrors

BRIEF DESCRIPTION OF THE DRAWINGS

The above and other objects and features of the present invention will become apparent from the following description of the preferred embodiments, when taken in conjunction with the accompanying drawings, in which.

DETAILED DESCRIPTION OF THE PREFERRED EMBODIMENTS

Figure 1A:
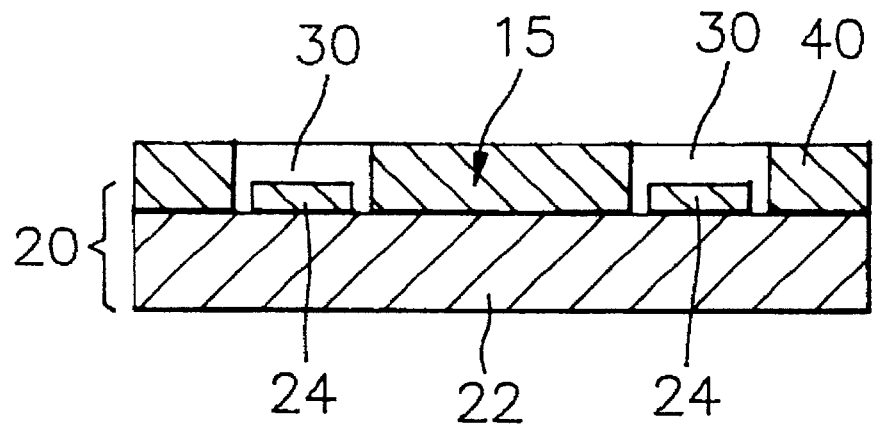
FIGS. 1A to 1G illustrate schematic cross sectional views setting forth manufacturing steps for an array of M×N thin film actuated mirrors previously disclosed.
Figure 1B:
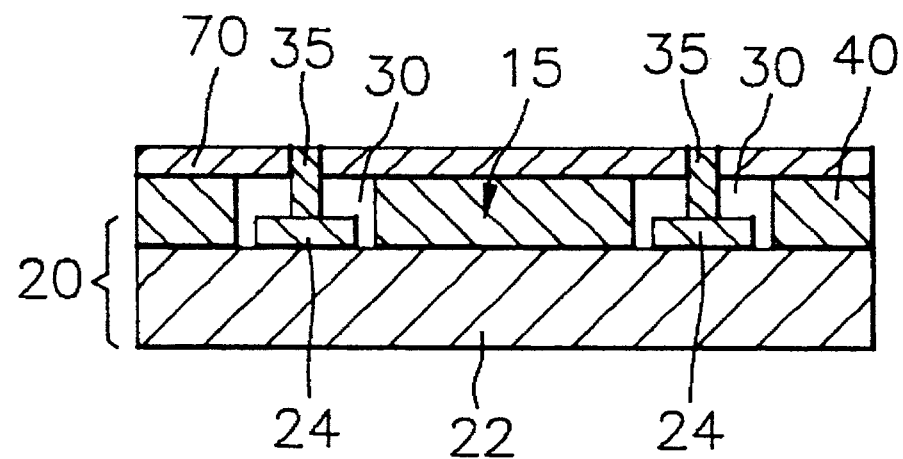
Figure 1C:
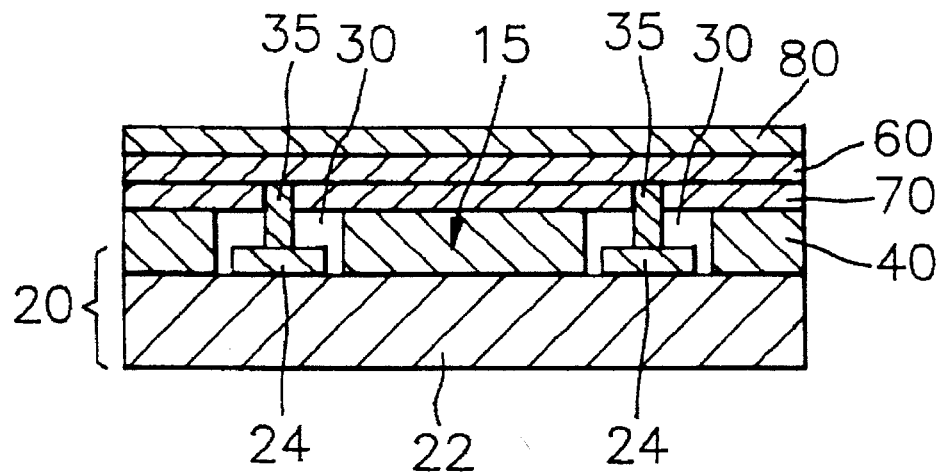
Figure 1D:
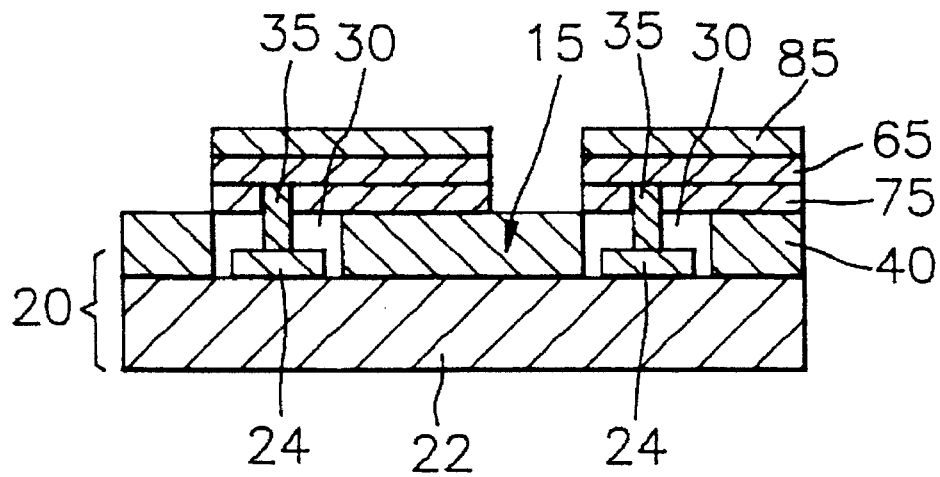
Figure 1E:
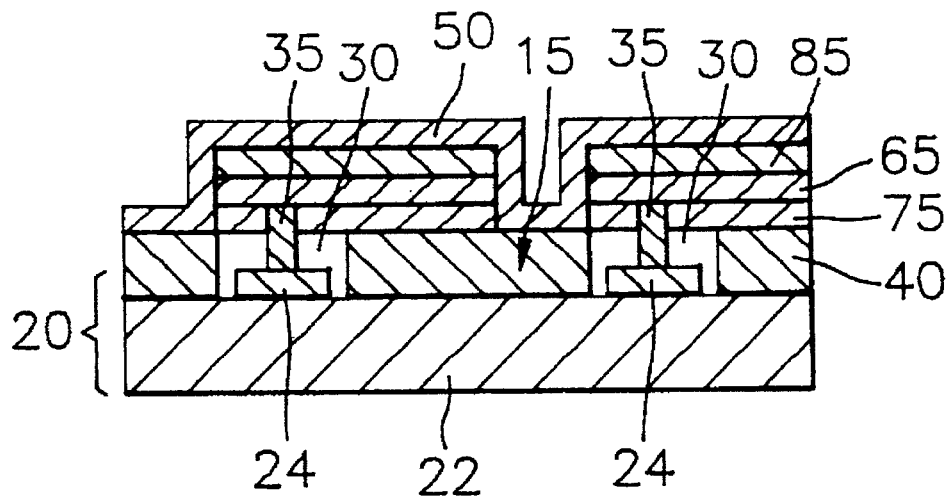
Figure 1F:
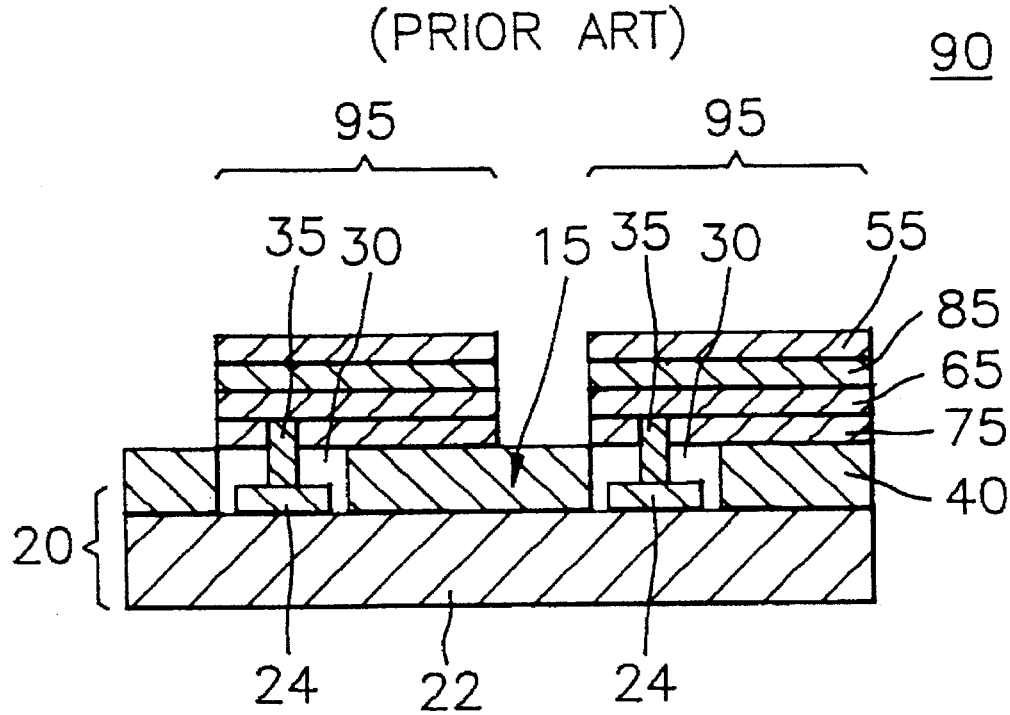
Figure 1G:
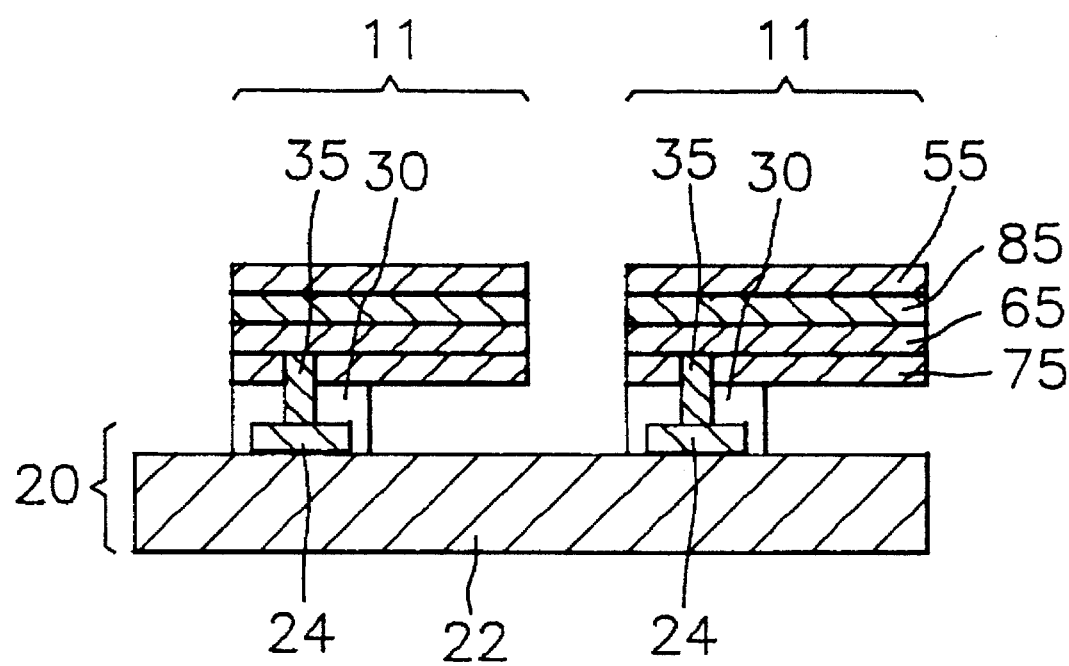

Referring now to FIGS. 2 and 3A to 3F, there are provided a cross sectional view of an array 200 of M×N thin film actuated mirrors 201, wherein M and N are integers, for use in an optical projection system and schematic cross sectional views setting forth a method for the manufacture thereof, respectively. It should be noted that like parts appearing in FIGS. 2 and 3A to 3F are represented by like reference numerals.

Figure 2:
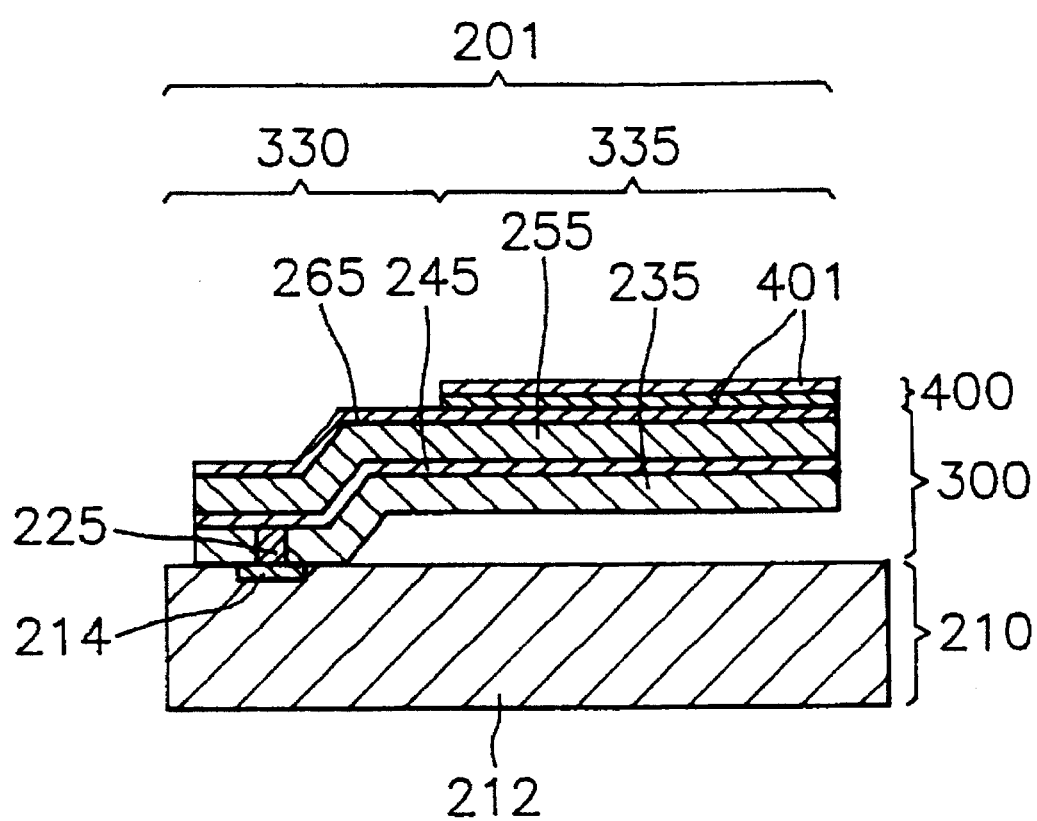
FIG. 2 presents a cross sectional view of an array of M×N thin film actuated mirrors in accordance with the present invention.

In FIG. 2, there is provided a cross sectional view of an array 200 of M×N thin film actuated mirrors 201 in accordance with one embodiment of the present invention, the array 200 including an active matrix 210, M×N conduits 225, an array of M×N actuating structures 300 and M×N number of multilayer stacks 400 of thin film dielectric members 401. For the sake of simplicity, in FIG. 2, there is shown an array 200 of M×N thin film actuated mirrors 201, each of the thin film actuated mirrors 201 having a multilayer stack 400 of thin film dielectric members 401, wherein the multilayer stack 400 consists of a pair of thin film dielectric members 401.

The active matrix 210 includes a substrate 212, an array of M×N connecting terminals 214 and an array of M×N transistors(not shown), wherein each of the connecting terminals 214 is electrically connected to a corresponding transistor.

Each of the actuating structures 300 is provided with a connecting and a light reflecting portions 330, 335, and includes an elastic member 235, a second thin film electrode 245, a thin film electrodisplacive member 255 and a first thin film electrode 265. Each of the conduits 225 made of an electrically conducting material is located at the connecting portion 330 in each of the actuating structures 300, extending from bottom of the second thin film electrode 245 to top of a corresponding connecting terminal 214 connected electrically to the transistor, thereby electrically connecting the second thin film electrode 245 to the transistor, allowing the second thin film electrode 245 to function as a signal electrode in each of the thin film actuated mirrors 201. The first thin film electrode 265 made of an electrically conducting and light reflecting material, e.g., Al, is electrically connected to ground, allowing it to function as a mirror as well as a bias electrode in each of the thin film actuated mirrors 201.

Each of the multilayer stacks 400 of thin film dielectric members 401 is placed on top of the light reflecting portion 335 in each of the actuating structures 300, wherein each of the thin film dielectric members 401 has a predetermined thickness and a specific refractive index.

In the visible region, it is possible to increase the reflectance of a simple metal layer by booting it with extra dielectric layers.

The characteristic reflectance R of a metal in air at normal incidence is $$R = \frac{1 - [2n/(1 + n^2 + k^2)]}{1 + [2n/(1 + n^2 + k^2)]} \quad \text{Eq. (1)}$$

wherein n and k are the refractive index and the extinction coefficient of the metal, respectively.

For example, if the metal is overcoated with two quarter-waves of material of refractive indices $n_1$ and $n_2$, $n_2$ being next to the metal, then the optical reflectance R thereof in air at normal incidence is $$R = \frac{1 - [2(n_1/n_2)^2 n]/[1 + (n_1/n_2)^4 (n^2 + k^2)]}{1 + [2(n_1/n_2)^2 n]/[1 + (n_1/n_2)^4 (n^2 + k^2)]} \quad \text{Eq. (2)}$$

This will be greater than the reflectance of the bare metal, given by Eq. (1), if $$\frac{2(n_1/n_2)^2 n}{1 + (n_1/n_2)^4 (n^2 + k^2)} < \frac{2n}{1 + n^2 + k^2}, \quad \text{Eq. (3)}$$

which is satisfied by either $$\left(\frac{n_1}{n_2}\right)^2 > 1 \quad \text{Eq. (4)}$$

or $$\left(\frac{n_1}{n_2}\right)^2 < \frac{1}{n^2 + k^2}$$

assuming that $n^2 + k^2 \geq 1$.

Accordingly to Eq. (4), the reflectance of any metal can be boosted by a pair of quarter-wave layers for which $(n_1/n_2) > 1$, $n_1$ being on the outside and $n_2$ next to the metal. The higher this ratio, the greater the increase in the reflectance.

For example, the untreated reflectance of aluminum is approximately 91.6% for a light beam having a wavelength of 550 nm at normal incidence.

If the aluminum is covered by two quarter-waves consisting of magnesium fluoride of index 1.38, next to the aluminum, followed by zinc sulfide of index 2.35, then $(n_1/n_2)^2 = 2.9$ and from Eq. (3), the reflectance jumps to 96.9%.

The reflectance of each of the thin film actuated mirrors 201 in the array 200 can be maximized by optimizing the thickness and the refractive index of each of the thin film dielectric members 401 constituting the multilayer stack 400, the number of thin film dielectric members 401 and the incidence through a simulation.

Each of the multilayer stacks 400 of thin film dielectric members 401, as well as protecting the first thin film electrode 265 in each of the actuating structures 300 from chemical or physical damages, but also provides the maximum reflectance in each of the thin film actuated mirrors 201, thereby ensuring an optimum optical efficiency in each of the thin film actuated mirrors 201 in the array 200.

In FIGS. 3A to 3F, there are provided schematic cross sectional views explaining a method for the manufacture of the array 200 of M×N thin film actuated mirrors 201 shown in FIG. 2.

The process for the manufacture of the array 200 begins with the preparation of an active matrix 210 including a substrate 212, an array of M×N connecting terminals 214 and an array of M×N transistors(not shown), wherein the substrate 212 is made of an insulating material, e.g., Si-wafer.

In a subsequent step, a thin film sacrificial layer 220, having a thickness of 0.1–2 μm, and made of a metal, e.g., copper(Cu) or nickel(Ni), a phosphor-silicate glass(PSG) or a poly-Si, is formed on top of the active matrix 210. The thin film sacrificial layer 220 is formed by using a sputtering or an evaporation method if the thin film sacrificial layer 220 is made of a metal, a chemical vapor deposition(CVD) method or a spin coating method if the thin film sacrificial layer 220 is made of a PSG, or a CVD method if the thin film sacrificial layer 220 is made of a poly-Si.

Thereafter, there is formed an array of M×N empty slots(not shown) in the thin film sacrificial layer 220 by using a photolithography method. Each of the empty slots is located around top of the connecting terminals 214.

In a following step, an elastic layer 230, made of an insulating material, e.g., silicon nitride, and having a thickness of 0.1–2 μm, is deposited on top of the thin film sacrificial layer 220 including the empty slots by using a Sol-Gel, a sputtering or a CVD method.

Figure 3A:
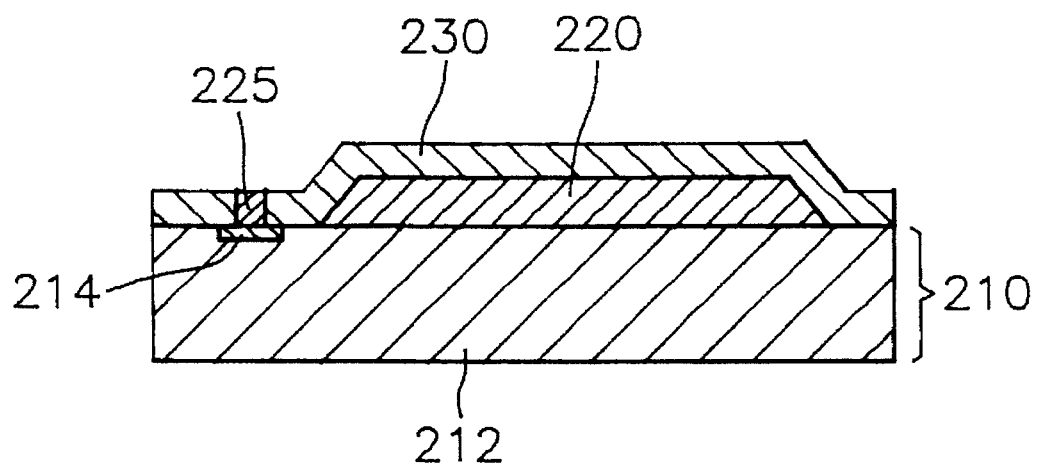
FIGS. 3A to 3F provide schematic cross sectional views explaining the present method for manufacturing the array of M×N thin film actuated mirrors shown in FIG. 2.

Subsequently, there is formed in the elastic layer 230 M×N conduits 225 made of a metal, e.g., tungsten(W). Each of the conduits 225 is formed by: first creating an array of M×N holes(not shown), each of the holes extending from top of the elastic layer 230 to top of the connecting terminals 214 by using an etching method; and filling therein with the metal by using a sputtering method, as shown in FIG. 3A.

Then, a second thin film layer 240, made of an electrically conducting material, e.g., platinum(Pt) or platinum/titanium (Pt/Ti), and having a thickness of 0.1–2 μm, is formed on top of the elastic layer 230 and the conduits 225 by using a sputtering or a vacuum evaporation method.

Next, a thin film electrodisplacive layer 250, made of a piezoelectric material, e.g., lead zirconium titanate(PZT), or an electrostrictive material, e.g., lead magnesium niobate (PMN), and having a thickness of 0.1–2 μm, is deposited on top of the second thin film layer 240 by using a vacuum evaporation or a sputtering method. The thin film electrodisplacive layer 250 is then heat treated to allow a phase transition to take place.

Figure 3B:
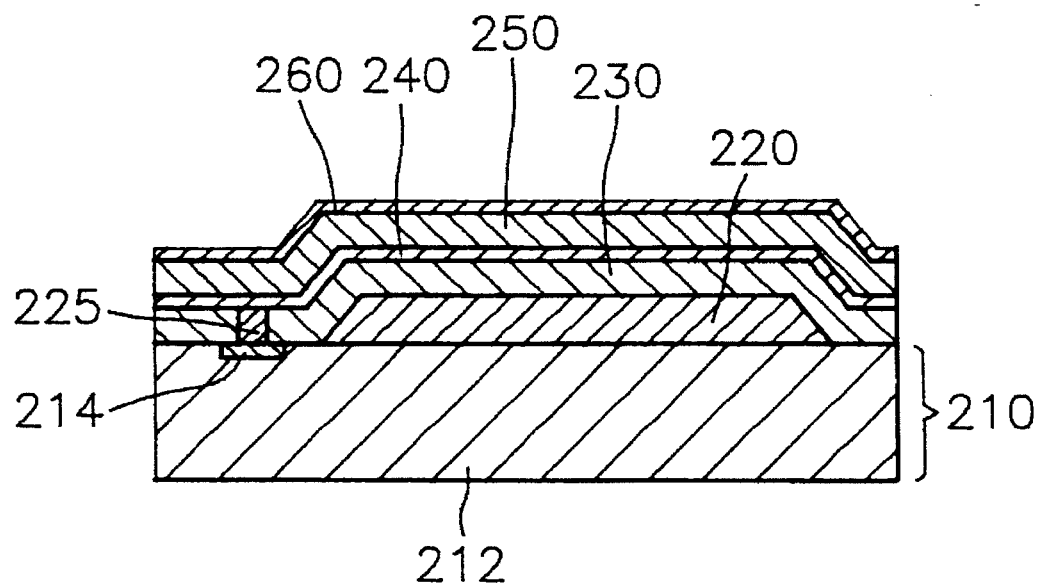

In a next step, a first thin film layer 260, made of an electrically conducting and light reflecting material, e.g., aluminum(Al) or silver(Ag), and having a thickness of 0.1–2 µm, is formed on top of the thin film electrodisplacive layer 250 by using a sputtering or a vacuum evaporation method, as shown in FIG. 3B.

Figure 3C:
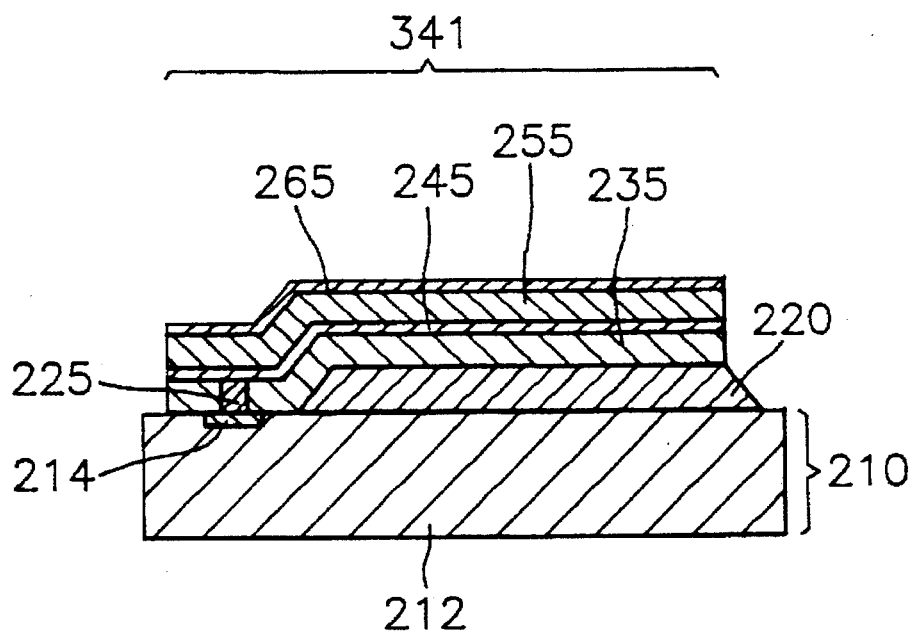

In a subsequent step, the first thin film layer 260, the thin film electrodisplacive layer 250, the second thin film layer 240 and the elastic layer 230 are, respectively, patterned until the thin film sacrificial layer 220 is exposed, thereby forming an array 340 of M×N semifinished actuating structures 341, as shown in FIG. 3C, wherein each of the semifinished actuating structures 341 includes a first thin film electrode 265, a thin film electrodisplacive member 255, a second thin film electrode 245 and an elastic member 235. The second thin film electrode 245 in each of the semifinished actuating structures 341 is electrically connected to the transistor through a corresponding conduit 225 and a corresponding connecting terminal 214, thereby functioning as a signal electrode in each of the thin film actuated mirrors 201. The first thin film electrode 265 in each of the semifinished actuating structures 341 functions as a mirror and a bias electrode in each of the thin film actuated mirrors 201.

Since each of the thin film electrodisplacive members 255 is sufficiently thin, there is no need to pole it in case it is made of a piezoelectric material: for it can be poled with the electric signal applied during the operation of the thin film actuated mirrors 201.

Subsequently, a plurality of thin film dielectric layer(not shown) is deposited successively on top of the semifinished actuating structures 341 including the exposed thin film sacrificial layer 220 by using a sputtering or an evaporation method. Each of the thin film dielectric layers has a predetermined thickness and a refractive index. Again for the sake of simplicity, only two thin film dielectric layers are shown.

Figure 3D:
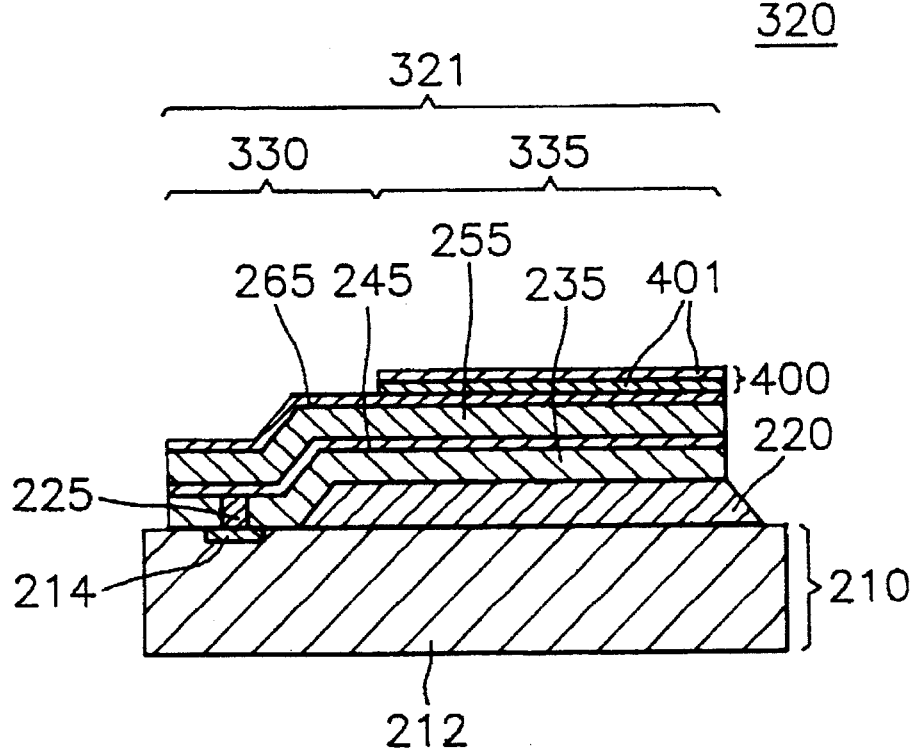

After the above step, the plurality of thin film dielectric layers are patterned, respectively, until the thin film sacrificial layer 220 is exposed again, into M×N number of multilayer stacks 400 of thin film dielectric members 401 by using a photolithography or a laser trimming method, thereby forming an array 320 of M×N semifinished actuated mirrors 321, as shown in FIG. 3D. The plurality of thin film dielectric layers are patterned in such a way that each of the semifinished actuated mirrors 321 has an actuating and a light reflecting portions 330, 335, wherein each of the conduits 225 is located at the actuating portion 330 in each of the semifinished actuated mirrors 321, and each of the multilayer stacks 400 of thin film dielectric members 401 is located at the light reflecting portion 335 in each of the semifinished actuated mirrors 321. Each of the semifinished actuated mirrors 321 includes the multilayer stack 400 of thin film dielectric members 401, the first thin film electrode 265, the thin film electrodisplacive member 255, the second thin film electrode 245 and the elastic member 235.

Figure 3E:
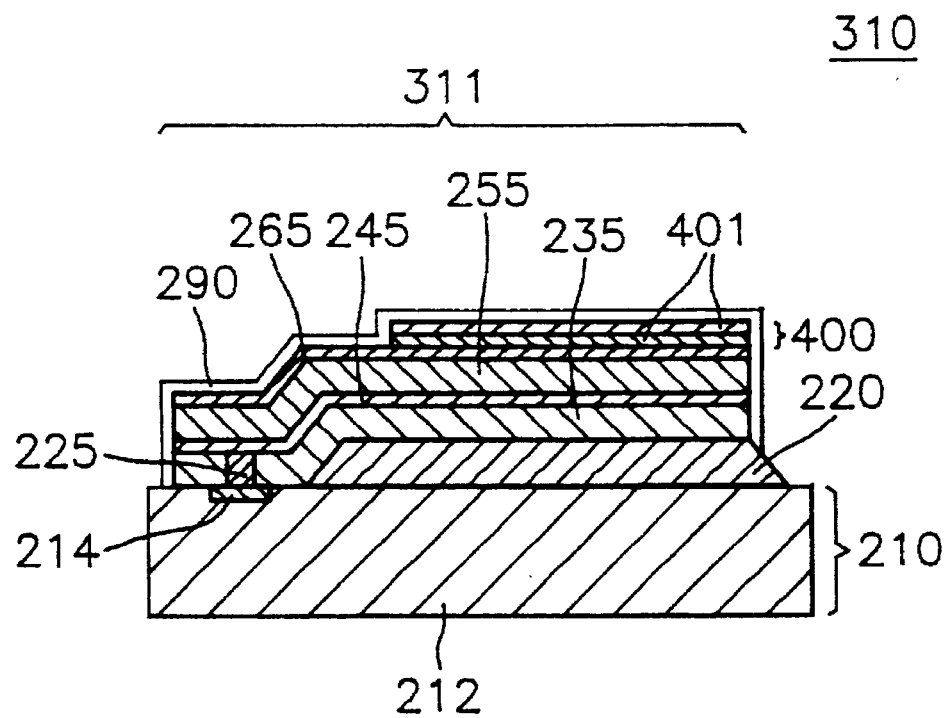

In an ensuing step, each of the semifinished actuated mirrors 321 is completely covered with a thin film protection layer 290 to thereby form an array 310 of M×N protected actuated mirrors 311, as shown in FIG. 3E.

Figure 3F:
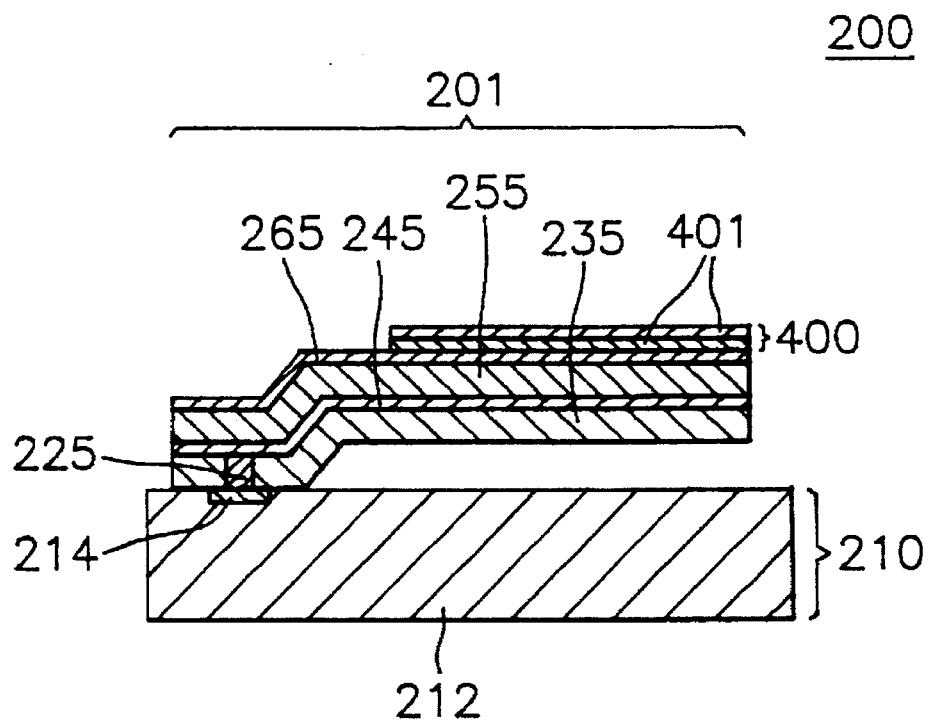

The thin film sacrificial layer 220 is then removed by using an etching method. Finally, the thin film protection layer 290 is removed to thereby form the array 200 of M×N thin film actuated mirrors 201, as shown in FIG. 3F.

It should be understood that, even though each of the thin film actuated mirrors 201 prepared using the inventive method has a unimorph structure, the inventive method can be equally applied to manufacturing an array of thin film actuated mirrors, each of the thin film actuated mirrors having a bimorph structure, for the latter case just involves the formation of an additional electrodisplacive layer and an additional electrode layer.

It should be further noted that the inventive method may be modified to allow the manufacture of an array of thin film actuated mirrors having different geometries.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, the array comprising:

an active matrix including a substrate, an array of M×N connecting terminals and an array of M×N transistors, wherein each of the connecting terminals is electrically connected to a corresponding transistor in the array of M×N transistors;

M×N conduits, wherein each of the conduits is made of an electrically conducting material;

an array of M×N actuating structures, each of the actuating structures being provided with a connecting and a light reflecting portions, each of the actuating structures including an elastic member, a second thin film electrode, a thin film electrodisplacive member and a first thin film electrode, wherein each of the conduits is located at the connecting portion in each of the actuating structures, extending from bottom of the second thin film electrode to top of the connecting terminal connected electrically to a corresponding transistor, to thereby allow the second thin film electrode to function as a signal electrode in each of the thin film actuated mirrors, and the first thin film electrode made of a light reflecting and electrically conducting material is grounded to thereby function as a mirror and a bias electrode in each of the thin film actuated mirrors; and M×N number of multilayer stacks of thin film dielectric members, each of the thin film dielectric members placed on top of the light reflecting portion in each of the actuating structures, wherein said each of the thin film dielectric members has a predetermined thickness and a specific refractive index.

2. The array of claim 1, wherein each of the thin film actuated mirrors is of a bimorph structure, the bimorph structure including a pair of electrodisplacive members separated by an electrode.

3. The array of claim 2, wherein each of the thin film actuated mirrors is further provided with an additional electrodisplacive layer and an additional electrode layer.

4. A method for the manufacture of an array of M×N thin film actuated mirrors, the method comprising the steps of:

providing an active matrix including a substrate, an array of M×N connecting terminals and an array of M×N transistors, wherein each of the connecting terminals is electrically connected to a corresponding transistor;

depositing a thin film sacrificial layer on top of the active matrix;

creating an array of M×N empty slots in the thin film sacrificial layer, each of the empty slots being located around top of the connecting terminals;

depositing an elastic layer made of an insulating material on top of the thin film sacrificial layer while filling the empty slots;

forming an array of M×N conduits in the elastic layer, each of the conduits extending from top of the elastic layer to top of a corresponding connecting terminal;

depositing a second thin film layer, a thin film electrodisplacive layer and a first thin film layer successively on top of the elastic layer, wherein the second thin film layer is made of an electrically conducting material, and the first thin film layer is made of an electrically conducting and light reflecting material;

patterning the first thin film, the thin film electrodisplacive, the second thin film and the elastic layers, respectively, until the thin film sacrificial layer is exposed, thereby forming an array of M×N semifinished actuating structures, wherein each of the semifinished actuating structures is provided with a first thin film electrode, a thin film electrodisplacive member, a second thin film electrode and an elastic member;

depositing a plurality of thin film dielectric layers successively on top of the semifinished actuating structures including the exposed thin film sacrificial layer, each of the thin film dielectric layers having a predetermined thickness;

patterning the plurality of thin film dielectric layers, respectively, into M×N number of multilayer stacks of thin film dielectric members, until the thin film sacrificial layer is exposed again, thereby forming an array of M×N semifinished actuated mirrors, wherein the plurality of thin film dielectric layers are patterned in such a way that each of the semifinished actuated mirrors is divided arbitrarily into an actuating and a light reflecting portions, each of the conduits and each of the thin film dielectric members being located at the actuating portion and the light reflecting portion in each of the semifinished actuated mirrors, respectively;

covering each of the semifinished actuated mirrors with a thin film protection layer to thereby form an array of M×N protected actuated mirrors;

removing the thin film sacrificial layer; and removing the thin film protection layer to thereby form the array of M×N thin film actuated mirrors.

5. The method of claim 4, wherein the plurality of thin film dielectric layers are deposited by using a sputtering or an evaporation method.

6. The method of claim 4, wherein each of the thin film actuated mirrors has a bimorph structure, the bimorph structure including a pair of electrodisplacive members separated by an electrode.

7. The method of claim 4 further comprises the formation of an additional electrode layer and an additional electrodisplacive layer, successively, after depositing the electrodisplacive layer.

* * * * *